(12) United States Patent
Yoshida et al.

(10) Patent No.: US 6,189,757 B1
(45) Date of Patent: Feb. 20, 2001

(54) OPTICAL FIBER CUTTER USING THE PRINCIPLE OF STRESS RUPTURE

(75) Inventors: Kyohiro Yoshida; Toshihiro Nakae, both of Osaka (JP)

(73) Assignee: Sumitomo Electric Industries, LTD, Osaka (JP)

(*) Notice: Under 35 U.S.C. 154(b), the term of this patent shall be extended for 0 days.

(21) Appl. No.: 09/197,772

(22) Filed: Nov. 23, 1998

(30) Foreign Application Priority Data

Dec. 12, 1997 (JP) .................................................. 9-362705
May 22, 1998 (JP) ................................................. 10-14741
Aug. 5, 1998 (JP) ................................................ 10-221735

(51) Int. Cl.[7] .............................. C03B 37/00; B26F 3/00
(52) U.S. Cl. ................................. 225/96; 225/94; 83/879
(58) Field of Search ................................ 225/93, 94, 96, 225/101, 96.5; 83/879, 881

(56) References Cited

U.S. PATENT DOCUMENTS

| 4,530,452 | * | 7/1985 | Balyasny et al. | 225/96 |
| 4,557,049 | * | 12/1985 | Cribbs et al. | 225/96 X |
| 4,674,666 | * | 6/1987 | Balyasny | 225/96 |
| 5,108,021 | * | 4/1992 | Vines | 225/96 X |
| 5,460,311 | * | 10/1995 | Fan | 225/96 |
| 5,501,385 | * | 3/1996 | Halpin | 225/96 |

FOREIGN PATENT DOCUMENTS 59-142503   8/1994   (JP) .

* cited by examiner

Primary Examiner—Boyer Ashley
(74) Attorney, Agent, or Firm—Pillsbury Winthrop LLP

(57) ABSTRACT

An optical fiber cutter for cutting an optical fiber wire according to the principle of the stress-rupture includes a tension applying mechanism and a movable blade. The tension applying mechanism applies tension to the optical fiber wire in an axial direction thereof. The movable blade is contactable with the optical fiber wire in a direction perpendicular to the axial direction so as to impart an initial crack to the optical fiber wire to which the tension is applied. The movable blade contacts the optical fiber wire in only one direction, which is perpendicular to the axial direction.

23 Claims, 10 Drawing Sheets

FIG. 12 *(Prior Art)*
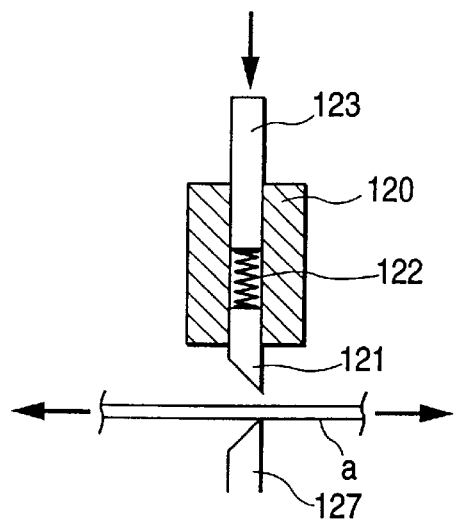
FIG. 13A *(Prior Art)*
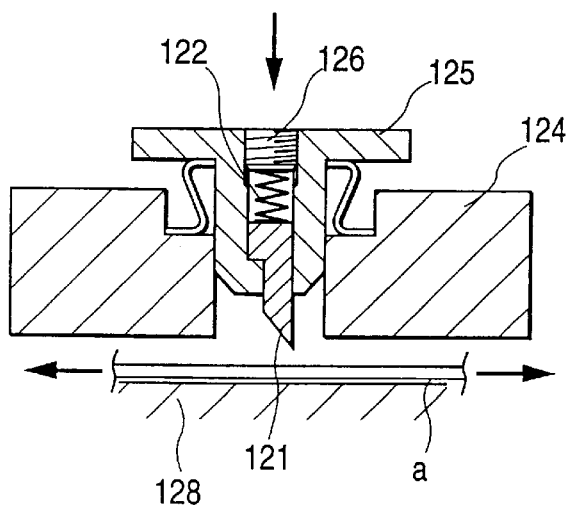
FIG. 13B *(Prior Art)*
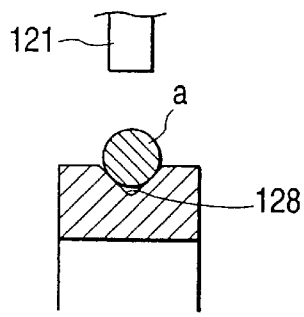

OPTICAL FIBER CUTTER USING THE PRINCIPLE OF STRESS RUPTURE

BACKGROUND OF THE INVETION

1. Field of the Invention

The present invention relates to an optical fiber cutter which cuts an optical fiber according to the principle of stress-rupture.

2. Description of the Related Art

A cutting method based on the principle of stress-rupture is used to cut an optical fiber wire in which either a core and a cladding are both made of glass, or only a core is made of glass. According to this cutting method, tension is applied to the optical fiber wire, and then a movable blade is used to impart a crack in an outer periphery of the wire while under tension. Using the crack as the starting point, a stress rupture in the wire is caused. Then, the wire is cut in a direction perpendicular to an axis of the wire, so as to obtain a cutting surface having a high degree of flatness.

A description will be now given of a related optical fiber cutter using the principle of stress-rupture with reference to FIGS. 11A and 11B. An optical fiber wire (not shown) is inserted into and secured to a ferrule (not shown), and then a cutter cuts a portion of the fiber that is projected from a tip end of the ferrule. This cutter also uses the stress-rupture principle in that, when a tension or stress is applied to a glass having a crack, the crack is progressed and the glass is split to create a flat surface that is perpendicular to a tensional direction.

This cutter has a diamond blade 5, a steel follower blade 31 opposing the blade 5, a mechanism which interposes the optical fiber wire between the both blades so as to provide an initial crack in the optical fiber wire, and a mechanism which applies tension to the optical fiber wire.

In the cutting of the wire, the ferrule with the projected optical fiber wire is fitted into a ferrule insertion portion 7 which is attached to a lower surface of a base 1, and then the optical fiber wire is arranged between clamp pieces 17. When a lever 3, which is supported by a frame 2, is rotated in a direction of the arrow shown in FIG. 11B, a slide block 16 connected to the lever 3 through a tension spring 12 is lifted up along a guide shaft 15. In accordance with the motion of the slide block 16, the clamp pieces 17 separate from a reverse V-shaped guide 9, and then close an opening between them so as to hold the optical fiber wire. The slide block 16 is lifted up while the clamp pieces 17 hold the optical fiber wire, so as to apply tension to the optical fiber wire.

Further, when the lever 3 is rotated, a pair of blade holders 24 are closed through a pressing piece 23 by means of a pin 11 located at an end of the lever 3. Thus, the distance between the blade 5 and a follow blade 31 respectively held in the blade holders 24 is narrowed. The optical fiber wire is caught by the blade 5 and the follow blade 31 in a horizontal direction which is perpendicular to an axial direction of the optical fiber wire, so that an initial crack is provided in the optical fiber wire. When tension is applied to the optical fiber wire, the initial crack progresses, and the optical wire is cut.

The above cutter cuts the optical fiber wire by interposing the fiber between the blade and the follow blade. However, it is realistically difficult to interpose the optical fiber wire in such a manner that the blade and the follow blade confront each other precisely. If there is a small gap between the blades during the confronting state, a stress directed in a direction other than the horizontal direction is undesireably applied to the optical fiber wire. As a result, the optical fiber wire is cut with a inclined surface with respect to the tip end surface of the ferrule, or, the application of the stress results in the optical fiber wire having a non-flat cut surface.

There is another cutting method which is based on the same stress-rupture principle, but which performs the steps in a different order. In this method, the optical fiber wire is first cracked. Next, a tension is applied to the optical fiber wire, to thereby cut the wire. The optical fiber wire is thereafter inserted and secured to the ferrule.

However, this method also has some problems which result in the cutting surface of the optical fiber wire being damaged, and difficulty in flatly securing the tip end surface of the ferrule and the cutting surface of the optical fiber wire.

FIGS. 12 to 13B show other related optical fiber cutters. In the cutter shown in FIG. 12, a movable blade 121 is inserted inside a fixing holder 120. The movable blade 121 is moved projectably through a spring 122 by pressing a button 123, so that an optical fiber wire a to which the tension is applied is cut by the movable blade 121 in conjunction with a follow blade 127.

In the cutter shown in FIGS. 13A and 13B, a button 125 for pushing the movable blade 121 can regulate movement of the movable blade 121 with respect to a mount 124 to a predetermined value. The movable blade 121 is inserted projectably into the button 125. Further, there is provided a blade pressure adjusting screw 126 and a spring 122, which is disposed between the screw 126 and the movable blade 121. In this structure, the optical fiber wire a to which the tension is applied is disposed on a guide groove 128, shown in FIG. 13B, and the wire a is cut by pressing the button 125. (This cutter is disclosed in Japanese Patent Unexamined Publication No. Sho 59-142503.)

The cutter shown in FIG. 12 requires the button 123 to be pushed by hand and transmits this pushing force to the movable blade 121, so as to cut the optical fiber wire a. However, the pushing force applied to the button 123 varies in accordance with a personal force level. Although the spring 122 functions as a cushioning device for preventing the optical fiber wire a from being cut too deeply by the movable blade 121, both the button 123 and the movable blade 121 move freely. Therefore, the structure of FIG. 12 has many indeterminate factors, and thus cannot stabilize a force upon cutting.

The cutting surface of the optical fiber wire is influenced by the force. Since a cutting depth of the blade varies in accordance with the irregularity of the force, the scattering loss of the transmitting light at the cutting surface may be large.

On the other hand, in the cutter of FIGS. 13A and 13B, since the amount of movement of the button 125 is regulated and the blade pressure can be adjusted by the screw 126, the influence according to the pushing level of the button 125 or the like is small. However, this cutter requires that the screw 126 is adjusted prior to actually cutting the optical fiber wire. And then, after observing a state of the cutting surface, the blade pressure is readjusted to obtain a better cutting surface. Accordingly, the operation for the cutter of FIGS. 13A and 13B is complicated.

In addition, the adjusting screw 126 may loosen when the cutter is used or carried. In such a case, the optical fiber wire may be cut after the adjusting screw has deviated from its proper position, or the screw 126 may need to be readjusted.

Further, even if the adjusting value is retained at a regulated value, the blade pressure may differ when a cutting operation is conducted by a person other than the adjuster. Accordingly, the cutting is unstable.

Moreover, the movable blade cuts the optical fiber wire in conjunction with the follow blade or the guide groove. Therefore, a stress may be applied in a direction other than a horizontal direction, which is perpendicular to the axis of the wire, to thereby form the non-flat cutting surface.

SUMMARY OF THE INVENTION

It is therefore an object of the present invention to provide an optical fiber cutter which can cut a surface of an optical fiber to form a smooth flat surface.

According to a first aspect to the invention, there is provided with an optical fiber cutter for cutting an optical fiber wire according to a principle of stress-rupture including: a tension applying unit for applying a tension to the optical fiber wire; a movable blade for imparting a crack in the optical fiber wire to which the tension is applied, the movable blade being supported so as to reciprocate linearly; a supporting portion provided at a predetermined position apart from the optical fiber; and an elastic body having one end fixed to the supporting portion. The movable blade is moved by an elastic restitutive force of the elastic body to impart the crack in the optical fiber wire.

According to the above structure, the movable blade cuts into the optical fiber wire using the force of the elastic body. Since one end of the elastic body is fixed at a predetermined position, the movable cutter reaches a cutting position on a condition that the elastic body is always elastically restituted by a predetermined amount. Thus, the blade pressure upon cutting is always uniformly maintained. Further, since the blade pressure decreases as a cutting amount of the blade with respect to the optical fiber wire increases, there is no concern of imparting an excessively deep crack in the optical fiber wire, or chipping the wire with excessive blade pressure. Accordingly, cutting is performed with reduced variation and increased stability.

According to a second aspect of the invention, there is provided with an optical fiber cutter for cutting an optical fiber wire according to the principle of the stress-rupture including: a tension applying unit for applying a tension to the optical fiber wire in an axial direction thereof; and a movable blade contactable with the optical fiber wire in a direction perpendicular to the axial direction so as to impart an initial crack in the optical fiber wire to which the tension is applied. The movable blade contacts the optical fiber wire in only one direction, which is perpendicular to the axial direction.

The above cutter does not impart the initial crack by catching the optical fiber wire. Rather, the cutter contacts the blade from only one direction, to thereby impart the initial crack from a horizontal direction perpendicular to the axial direction of the optical fiber wire. Accordingly, the cutting face of the optical fiber wire parallel with a horizontal plane perpendicular to the axial direction is obtained.

BRIEF DESCRIPTION OF THE DRAWINGS

Similar reference characters denote corresponding features consistently throughout the attached figures. The preferred embodiments of this invention will be described in detail, with reference to the following figures, wherein;

FIG. 12 is a cross-sectional view indicating a cutting state of another related optical fiber cutter;

FIG. 13A is a cross-sectional view indicating a cutting state of another related optical fiber cutter;

FIG. 13B is a cross-sectional view indicating a holding state of an optical fiber wire according to the related optical fiber cutter of FIG. 13A.

DETAILED DESCRIPTION OF THE PREFERRED EMBODIMENTS

Figure 1A:
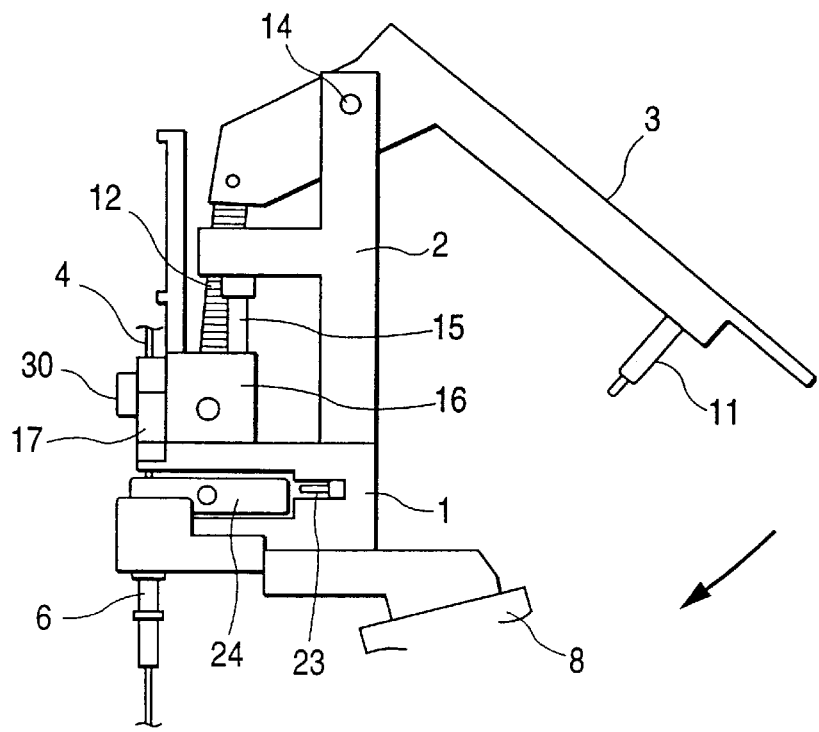
FIG. 1A is a side view of an optical fiber cutter in a lever liberation condition according to a first embodiment of the invention.

A preferred embodiment of the invention will now be described with reference to the figures.

[First embodiment]

An optical fiber cutter shown in FIGS. 1A to 2B has a frame 2 mounted on a base 1, a lever 3 rotatably supported by the frame 2, a tension application mechanism for an optical fiber wire 4 operated by the lever 3, and an operation mechanism of a blade 5.

The base 1 is shaped like a thin block formed with a recessed portion that opens a front surface and side surfaces of the base 1. The recessed portion receives the below-described operation mechanism of the blade 5. An insertion portion 7 for a ferrule 6 is formed in a front side of the lower portion of the base 1, and a grip 8 (partially omitted in the figures) is attached to a back side thereof. On the other hand, a reverse V-shaped guide 9 is integrally provided on a front side of the upper face of the base 1, and the frame 2 is secured to a back portion thereof. An insertion groove 10 for the optical fiber 4 is formed in the middle of the reverse V-shaped guide 9. In addition, the frame 2 has a T-shaped side surface providing a vertical plane and a horizontal plane, and the L-shaped lever 3 is rotatably supported at an upper end of the vertical plane.

A pin 11 is projectively provided on one end of the lever 3, and a tension spring 12 is attached to the other end. In addition, a torsion spring (not shown) is arranged to a support shaft 14 of the lever 3. The force of the torsion spring causes the lever 3 to be usually retained in an open state (shown in FIG. 1A).

The tension application mechanism for the optical fiber wire 4 is provided between the horizontal plane of the frame 2 and the upper face of the base 1. The mechanism has a slide block 16 and a pair of clamp pieces 17. The slide block 16 is penetrated by a pair of guide shafts 15 fixed between the horizontal plane of the frame 2 and the upper face of the base 1, so that the slide block 16 moves vertically. The pair of clamp pieces 17 is arranged in front of the slide block 16.

Figure 2A:
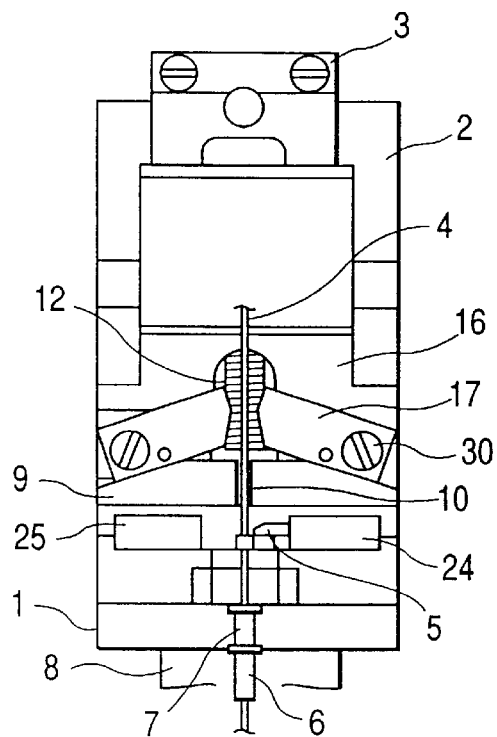
FIG. 2A is a front view of the optical fiber cutter in a lever liberation condition according to the first embodiment.
Figure 2B:
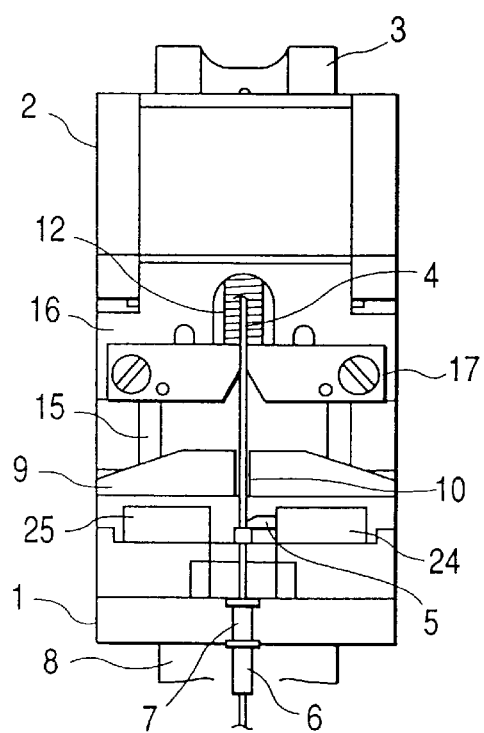
FIG. 2B is a front view of the optical fiber cutter in a lever operation condition according to the first embodiment.
Figure 3:
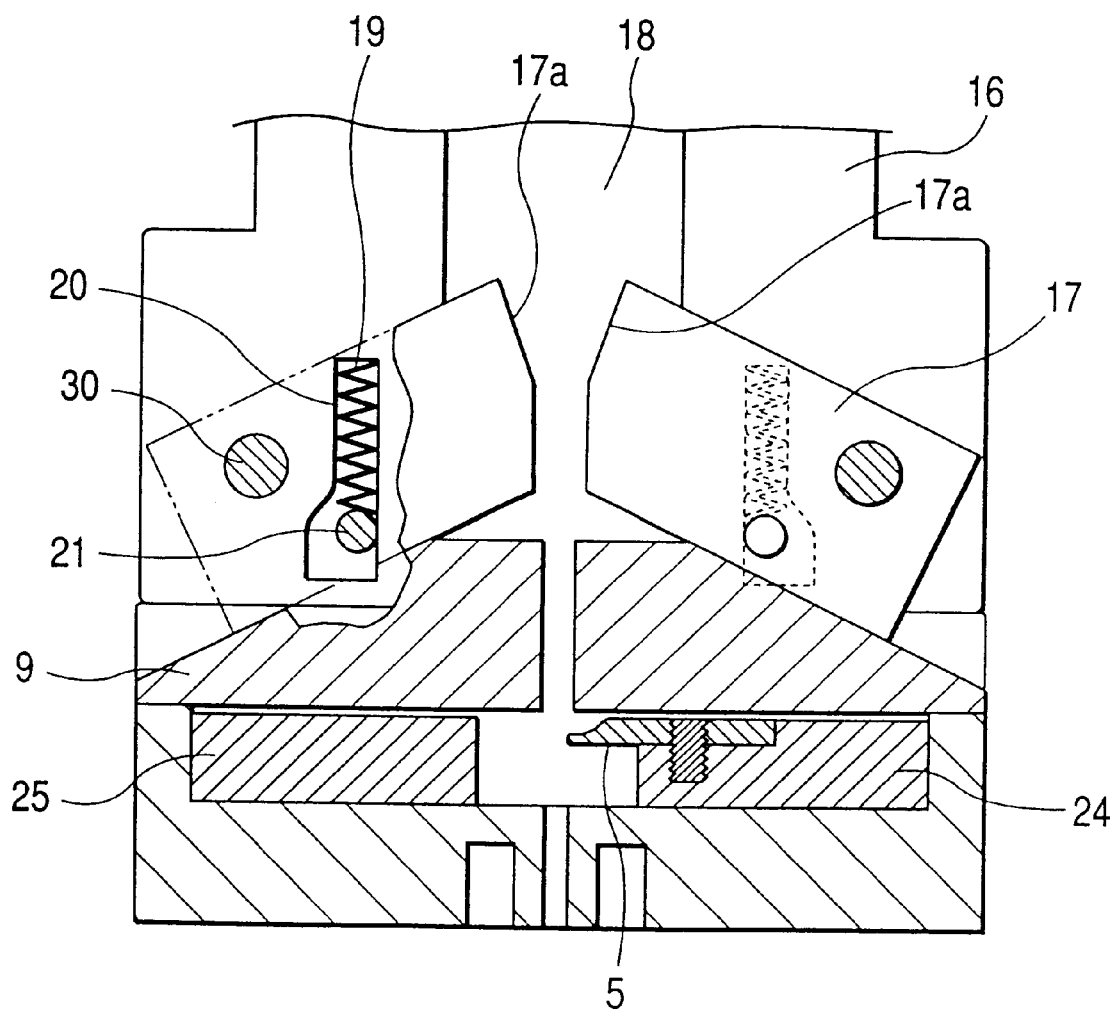
FIG. 3 is an explanation view showing an operation mechanism of a clamp of the optical fiber cutter according to the first embodiment.

The tension application mechanism is described in detail with reference to FIG. 3. The slide block 16 is formed with an attachment groove 18 and receiving grooves 20. The attachment groove 18 allows space for tension spring 12 that vertically extends in the middle position of the slide block 16. The receive grooves 20 allows space for compression springs 19 in front of the slide block 16 in such a manner that the attachment groove 18 is placed between the receive grooves 20. Each of the clamp pieces 17 is a substantially rectangular plate shape and is attached to the slide block 16 so as to be rotatable about their respective locking screws 30. Each clamp piece 17 is provided with a pin 21 extending from the back surface of the respective clamp piece 17 to the respective receive groove 20. Each compression spring 19 fitted into the respective receive groove 20 of the respective slide block 16 is abutted on an upper end of the respective receive groove 20 at one end thereof and the respective pin 21 at the other end thereof. Holding portions 17a of the clamp pieces 17 are therefore usually pressed downwardly in accordance with the operation of the compression springs 19, so that the holding portions 17a approach each other. Further, the slide block 16 is provided with a tension spring 12 (shown in FIGS. 1A to 2B) that is arranged in a shaft (not shown) of the attachment groove 18, and is connected to the end of the lever 3.

Figure 1B:
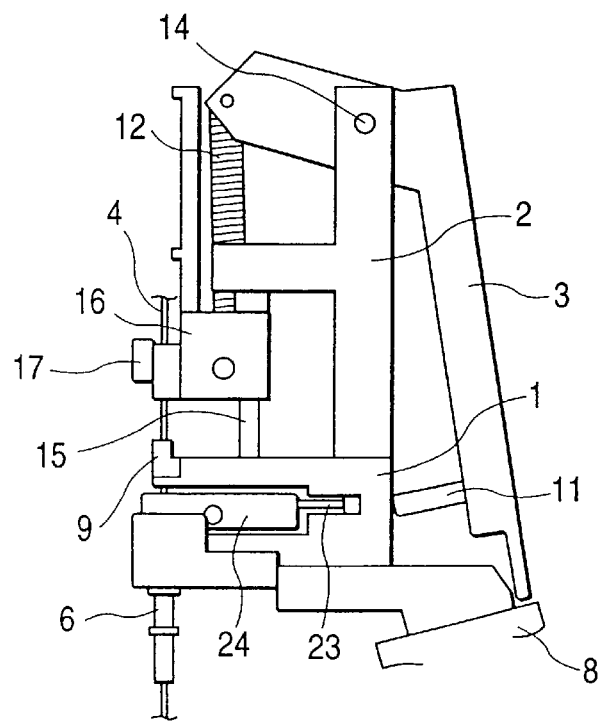
FIG. 1B is a side view of the optical fiber cutter in a lever operation condition according to the first embodiment.

When the lever 3 is opened, the slide block 16 is abutted on the upper face of the base 1 and each of clamp pieces 17 is pushed up by the reverse V-shaped guide 9 against the bounce of the compression spring 19. The holding portions 17a are thereby retained in an open state (FIGS. 1A and 2A). On the other hand, when the lever 3 is closed, the slide block 16 is lifted up by the tension spring 12, so that the clamp pieces 17 are separated from the reverse V-shaped guide 9 (FIGS. 1B and 2B) Then, the holding portions 17a of the clamp pieces 17 are pushed down by the compression springs 19, and approach to each other, so that the holding portions 17a hold the optical fiber wire 4. Since the slide block 16 is further lifted up by this condition, tension is applied to the optical fiber wire 4.

Figure 4:
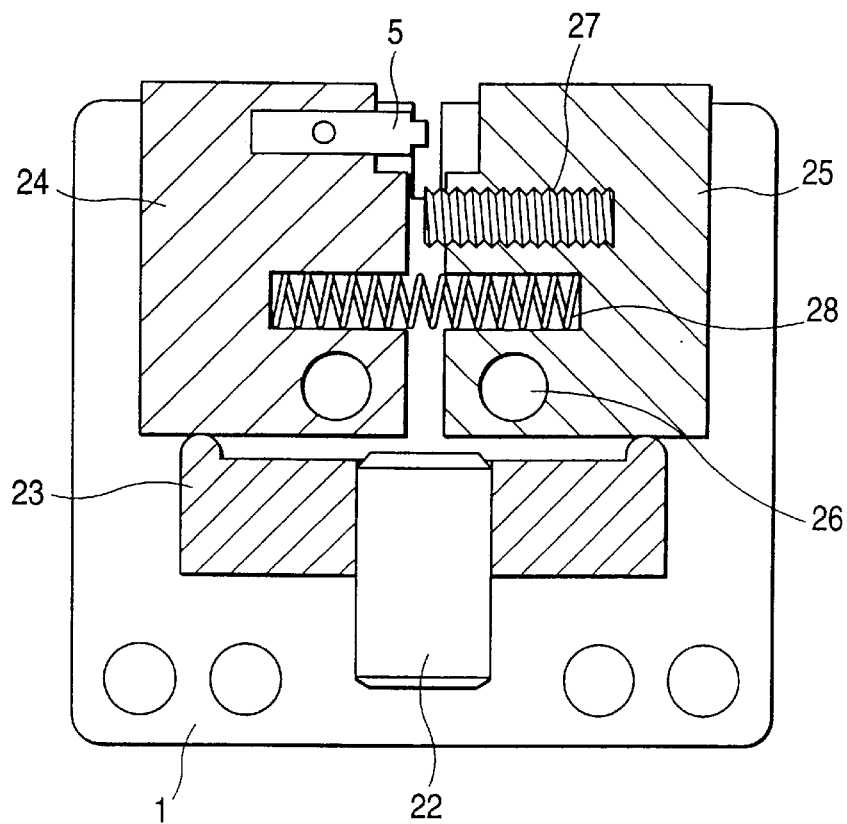
FIG. 4 is an explanation view showing an operation mechanism of a blade of the optical fiber cutter according to the first embodiment.

Next, the operation mechanism of the blade 5 will be described with reference to FIG. 4. FIG. 4 is a top view of the interior of the base 1 showing the structure of the operation mechanism. The blade 5 is operated in association with the press of the pin 11 provided in the end of the lever 3, when the lever 3 is closed. The base 1 is formed with a circular hole in a rear surface thereof, and a press shaft 22 is inserted into the circular hole. Further, a pressing member 23 is attached to the press shaft 22, and both ends of the pressing member 23 have protrusions formed in a front side of the pressing member 23.

In addition, a blade holder 24 and an opposing plate 25 are arranged abreast in the front side of the pressing member 23, and each of the blade holder 24 and the opposing plate 25 is pivotable around a respective shaft 26. The blade holder 24 is provided with a diamond blade 5 and the opposing plate 25 is screwed with a regulation screw 27 regulating the operation range of the blade 5. However, in the opposing plate 25, there is no following blade opposing the blade 5. Further, a compression spring 28 is interposed between the blade holder 24 and the opposing plate 25, so as to usually maintain the blade holder 24 and the opposing plate 25 in an open state.

When the lever 3 is closed, the pin 11 reaches the rear surface of the base 1 to thereby press an end surface of the press shaft 22. The press shaft 22 and the attachment pressing member 23 move in a direction toward the blade holder 24 and the opposing plate 25. Then, the blade holder 24 and the opposing plate 25 are pivoted around the respective shaft 26, and the blade holder 24 and the opposing plate 25 approach each other until the blade holder 24 contacts an end of the regulation screw 27. With this motion, the blade 5 contacts the optical fiber wire 4. The moving distance of the blade 5 can be changed by adjusting a projecting amount of the regulation screw 27.

A method of using the cutter and the motion of each of the parts will be described.

When the optical fiber wire 4 is to be cut, the optical fiber wire 4 is inserted into and secured to the ferrule 6, so as to project from the ferrule 6. The ferrule 6 is fitted to the ferrule insertion portion 7 of the base 1 (FIGS. 1A and 2A). Then, an end surface of the ferrule 6 is positioned to be substantially even with a lower surface of the blade 5. The optical fiber wire 4 projecting from the ferrule 6 is interposed between the clamp pieces 17 while passing through the insertion groove 10 of the reverse V-shaped guide 9. When the lever 3 is rotated, the slide block 16 connected to the tension spring 12 is lifted up along the guide shafts 15 (FIGS. 1B and 2B). In accordance with this motion, the clamp pieces 17 are separated from the reverse V-shaped guide 9, so that the holding portions 17a close to hold the optical fiber wire 4. The slide block 16 is further lifted up while the clamp pieces 17 hold the optical fiber wire 4, whereby tension is applied to the optical fiber wire 4.

Although the slide block 16 is stopped when it holds the optical fiber wire 4, the pin 11 of the lever 3 does not reach the rear surface of the base 1 at this time. When the lever 3 is further rotated, the tension spring 12 is stretched, so that the pin 11 provided in the end of the lever 3 presses the end surface of the press shaft 22 (FIG. 4). Thus, the pressing member 23 integrated with the press shaft 22 causes the blade holder 24 and the opposing plate 25 to rotate, to thereby approach each other. Thus, the blade 5 integrated with the blade holder 24 contacts the optical fiber wire 4 from a direction perpendicular to an axial direction of the optical fiber wire 4, and an initial crack is applied to the optical fiber wire 4. The optical fiber wire 4 is cut when the initial crack is developed by the tension applied to the optical fiber.

[Test of Embodiment 1]

Figure 5:
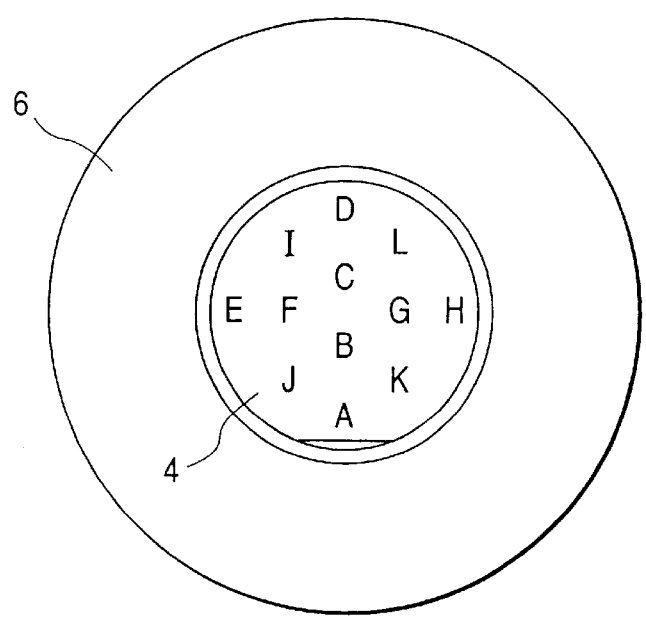
FIG. 5 is a plane view showing a cut surface of an optical fiber at a tip end surface of a ferrule according to the first embodiment.
Figure 11A:
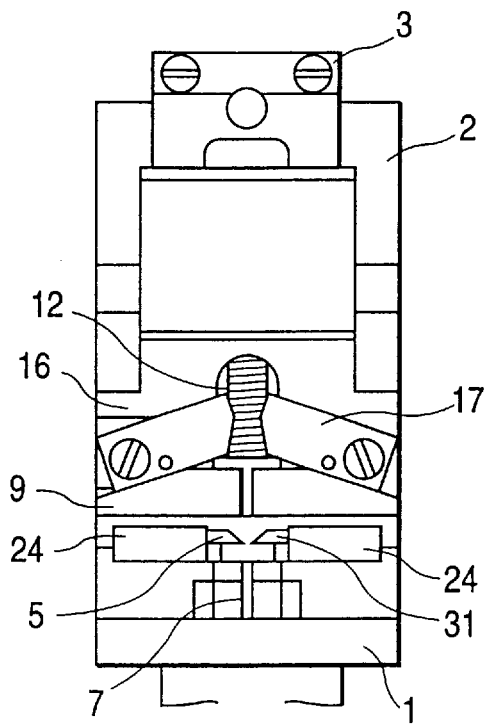
FIG. 11A is a front view of a related optical fiber cutter.
Figure 11B:
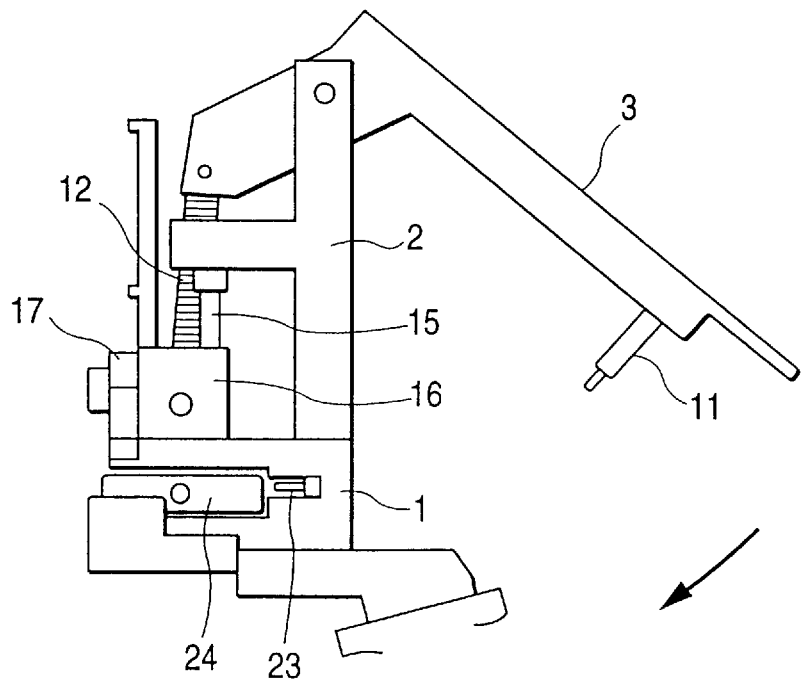
FIG. 11B is a side view of the related optical fiber cutter.

The irregularity (height) of the cut surface of the optical fiber wire with respect to the end surface of the ferrule is measured by actually cutting the optical fiber with the cutter of the invention (embodiment 1) and the related cutter shown in FIGS. 11A and 11B (comparison embodiment). The characters A to L shown in FIG. 5 represent the measurement points of the cut surface of the optical fiber wire.

The test was done twice for each of the cutters, and the average and the triple value of the standard deviation of the measured results were determined. The results are shown in Table 1.

As shown in Table 1, according to the invention, a cut surface of an optical fiber wire having a high smoothness and little irregularity is stably obtained. On the other hand, the cutter surface according to the comparison embodiment has large irregularity and a large dispersion in irregularity.

TABLE 1

| measurement point | embodiment | | comparative example | |
|---|---|---|---|---|
| | 1 | 2 | 1 | 2 |
| A | −6.75 | −0.25 | 1.75 | 2.75 |
| B | −8.125 | −1.375 | 9.625 | 9.125 |
| C | −9.125 | 0.375 | 19.375 | 24.875 |
| D | −14.25 | −1.75 | 31.25 | 33.25 |
| E | −16.5 | 9.25 | 4.5 | 6 |
| F | −11.25 | 10.375 | 13.75 | 9 |
| G | −5.75 | 10.625 | 34.25 | 27 |
| H | −0.5 | 14.75 | 43.5 | 30 |
| I | −18.5 | 1.5 | 16.5 | 23.5 |
| J | −12 | 6 | −1 | 2 |
| K | −2 | 5.5 | 31 | 10 |
| L | −2.5 | 7 | 45.5 | 38.5 |
| min. | −18.5 | −1.75 | −1 | 2 |
| max. | −0.5 | 14.75 | 45.5 | 38.5 |
| ave. | −9 | 5.166666 | 20.83333 | 18 |
| 3σ | 17.37038 | 16.33126 | 48.02085 | 38.50018 | unit: μm

As described above, according to the cutter of the invention, since the blade contacts the optical fiber wire from only one direction, the initial crack is surely obtained from a direction perpendicular to the axial direction of the optical fiber. The resulting cut surface is therefore very smooth. Further, the cut surface of the optical fiber wire can be easily arranged to be flush with the end surface of the ferrule.

[Second embodiment]

Next, a second embodiment of the invention will be described with reference to FIGS. 6–10.

Figure 6:
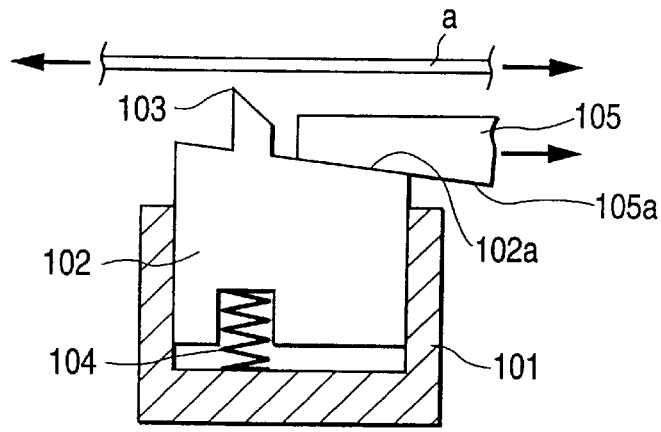
FIG. 6 is a cross-sectional view indicating a cutting mechanism of an optical fiber cutter according to a second embodiment of the invention.

FIG. 6 shows a cutter mechanism of the cutter according to the second embodiment of the invention.

In FIG. 6, reference numeral 101 designates a holder secured to a main body (not shown) of the cutter; 102, a blade base projectablly inserted into the holder 101; 103, a movable blade attached to the blade base 102; 104, a spring interposed between the holder 101 and the blade base 102; 105, a guide contacted with a front face 102a of the blade base 102. In addition, reference character a designates an optical fiber wire that is to be cut. The optical fiber wire a is positioned and held at a predetermined position with a tension applied thereto. In the wire a, either only a core is formed of glass, or both the core and a cladding are formed of glass. The guide 105 is supported by a slide guide (not shown) that is provided on the main body of the cutter and is slidable in a direction (in the drawing, a longitudinal direction of the optical fiber wire a) perpendicular to a moving direction of the blade base 102. The front face 102a of the blade base 102 and a guide face 105a in contact with the front face 102a are inclined with respect to a slide direction of the guide 105. Alternatively, only one of the front face 102a and the guide face 105a may be inclined. According to the displacement of the guide face 105a in association with the movement leftwards of the guide 105, the blade base 102 compresses the spring 104 and is pressed into the holder 101. In this state, the optical fiber wire a is set at a predetermined position with tension applied thereto. When the guide 105 is slid rightwards, the blade base 102 is pushed out of the holder 101 by a force of the spring 104.

The blade base 102 and integrated movable blade 103 move toward the optical fiber wire a to a fixed position, whereby the movable blade 103 reaches an outer periphery of the optical fiber wire a and imparts a shallow crack in the wire a. And then, using the crack as the staring point, a stress rupture of the wire is caused, and the wire a is cut in a direction perpendicular to an axis of the wire a.

The cutter of the second embodiment can control the blade pressure of the movable blade 103 by adjusting the distance from the cutting point to the fixed end of the spring 104 and an elastic coefficient of the spring 104. Thus, the initially set blade pressure is maintained almost without any change. The only factor changing the set blade pressure is a variation in the distance due to a contact abrasion between the guide 105 and blade base 102. But, this variation is minute. Accordingly, the cutting is always stabilized, and the variation in cutting face is minimized.

Figure 7:
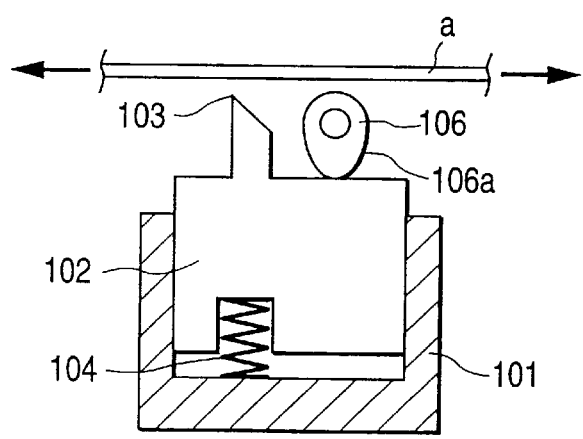
FIG. 7 is a cross-sectional view indicating another cutting mechanism of the optical fiber cutter according to the second embodiment.

FIG. 7 is a cutting mechanism of another cutter having a cam 106 in place of the guide 105 of FIG. 6. The cam 106 is rotatablly attached to the main body at a predetermined position. A cam face 106a being an outer periphery of the cam 106 is in contact with the front face of the blade base 102.

This structure can linearly reciprocate the blade base 102 in association with the rotation of the cam 106. When the blade base 102 is moved forward, the movable blade 103 cuts into the optical fiber wire a according to the force of the spring 104.

In the cutters shown in FIGS. 6 and 7, since the movement of the blade base 102 is controlled by the guide 105 and the cam 106, respectively, the blade pressure is further stabilized and excessive cutting of the blade is completely prevented.

Figure 8:
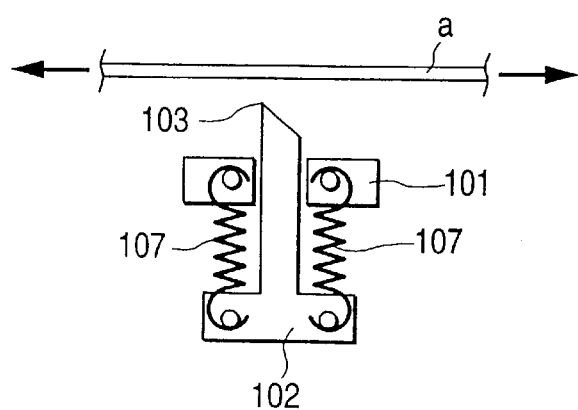
FIG. 8 is a cross-sectional view indicating another cutting mechanism of the optical fiber cutter of the second embodiment.

FIG. 8 shows a cutting mechanism of another cutter in which tension springs 107 are applied as elastic members. The blade base 102 provided with the movable blade 103 is slidably inserted into a hole of the holder 101 fixed to the main body (not shown). The tension springs 107 are provided between the blade base 102 and the holder 101 so that one of each of the ends thereof is fixed to the blade base 102 and the other of each of the ends thereof is fixed to the holder 101. In the cutting mechanism shown in FIG. 8, the blade base 102 is pulled so as to extend the spring 107, and the movable blade 103 cuts into the optical fiber wire a according to the shrinking force of the spring 107. The cutter of this type can obtain the same effect as the cutters shown in FIGS. 6 and 7 by providing the above-mentioned respectively guide and cam in the front of the blade base 102 so as to regulate the movement of the blade base 102. In the cutters shown in FIGS. 6 to 8, the holding of the optical fiber wire a and the application of the tension can be conducted by two pairs of the chucks (not shown) or the like being contactable with and separatable from the wire a.

Figure 9:
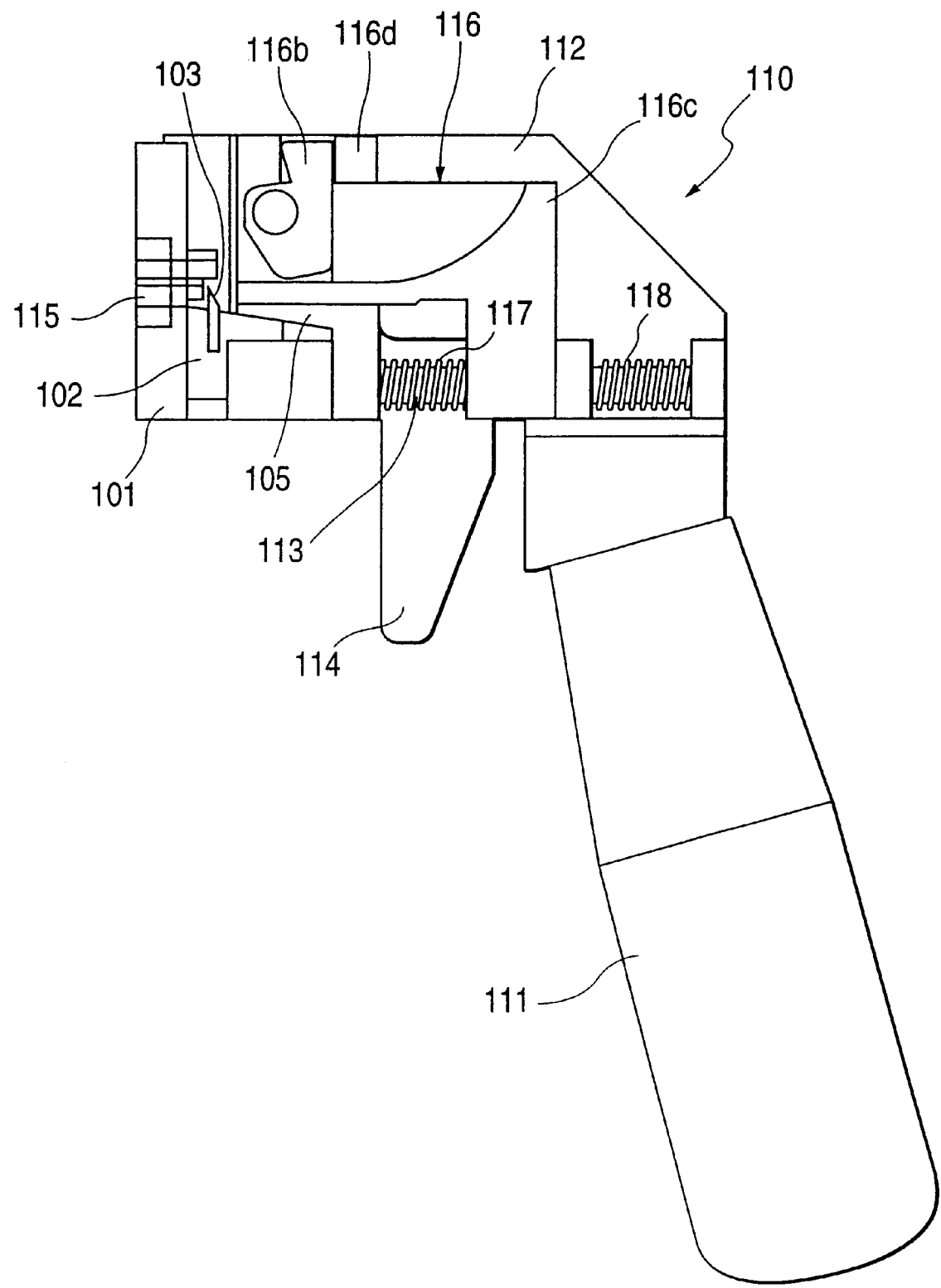
FIG. 9 is a side view of the hand-type optical fiber cutter using the structure of FIG. 6.
Figure 10:
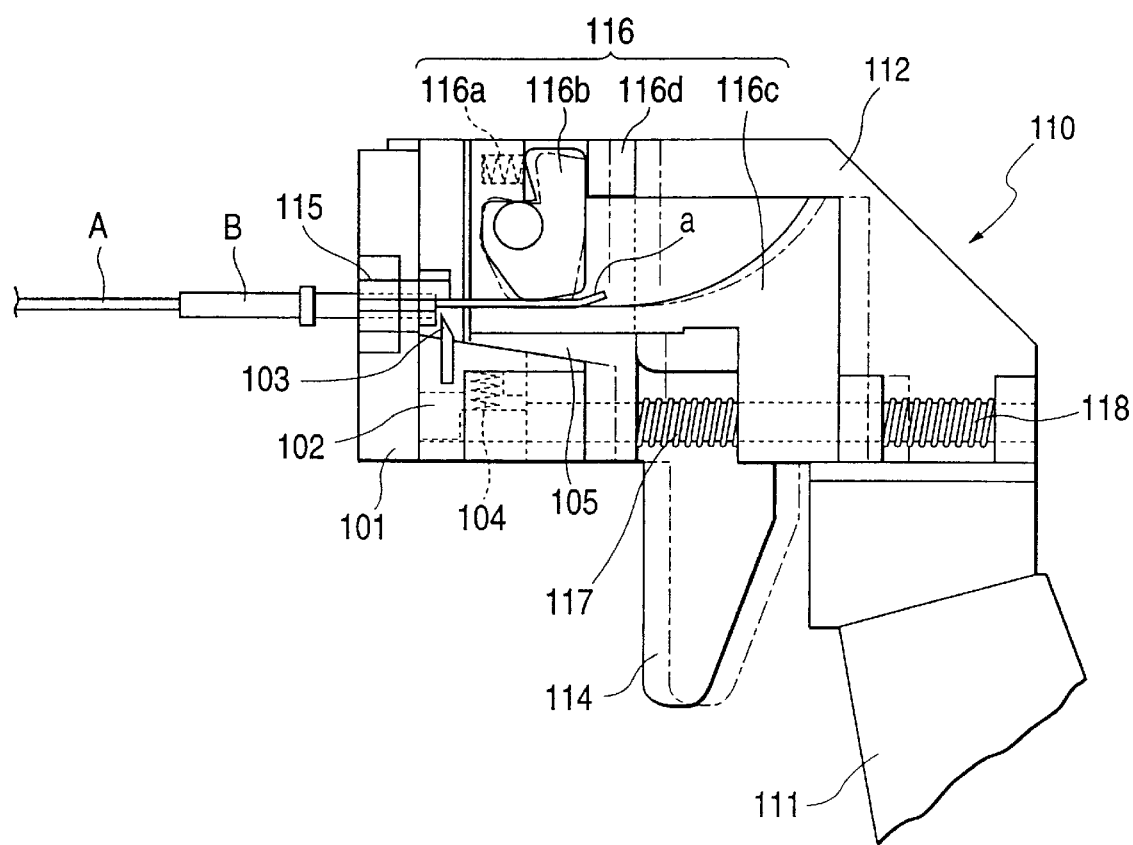
FIG. 10 is an enlarged side view indicating a main portion of the optical fiber cutter of FIG. 9.

FIGS. 9 and 10 show a hand-type optical fiber cutter having the structure of FIG. 6.

In FIGS. 9 and 10, reference numeral 110 designates a cutter. A main body 112 is integrated with a grip 111. A trigger 114 is guided by a guide rod (slide guide) 113. The cutting mechanism includes the holder 101, the blade base 102, the movable blade 103, the spring 104, and the guide 105. An anchor 115 for a ferrule B is fitted to one end of an optical fiber A. A chuck 116 grasps the optical fiber wire a. Reference numerals 117 and 118 respectively represent two return springs The guide 105 is integrally formed with the trigger 114. When the trigger is pulled, the guide 105 is moved rightwardly in the drawing, and the blade base 102 is pressed up by the spring 104, whereby the movable blade 103 cuts into the optical fiber wire a. When the trigger 114 is released, the trigger 114 and the guide 105 are returned to their original positions while compressing the spring 104.

The wire a of the optical fiber A is projected from a tip end of the ferrule B, and the projected portion (i.e., excessive portion) is cut off by the movable blade 103.

The ferrule B is retained by the anchor 115, and in this condition, the optical fiber wire a is grasped by the chuck 116, whereby tension is applied to he wire a. The chuck 116 includes a cam 116b urged by a spring 116a, a main portion 116c interlocked with the trigger 114, and a stopper 116d for regulating the rotation of the cam 116b. When the trigger 114 is pulled, the stopper 116d, which is integral with the trigger 114 and the guide 105, is moved out of a rotation constraint position, so that the cam 116b is rotated by the spring 116a, and thus a tip end of the optical fiber wire a is held between the cam 116b and the main portion 116c. In this condition, when the trigger 114 is further pulled, the main portion 116c is given stress rightward in the drawing by the extension of the spring 117, so that tension is applied to the optical fiber wire a. Then, the movable blade 103 is slowly contacted with the wire a in accordance with the force of the spring 104 so that the initial crack is imparted to the wire, and then the wire is cut as a result of stress-rupture.

In each of the cutters shown in FIGS. 6, 7 and 9, the blade base 102 is made of aluminum and the guide 105 or the cam 106 is made of brass. In a condition that the blade base 102 is formed of a material that is less than 300 N/mm$^2$ in tensile strength and the guide 105 or the cam 106 is formed of a material that is more than 400 N/mm$^2$ in tensile strength, the abrasion of the guide 105 or the cam 106 can be constrained.

Next, a description will be given of a result of an optical fiber cutting test in which the cutter of FIG. 9 is compared with the related cutter of FIG. 12.

The optical fiber wire to be cut is formed so that the core glass and the cladding is plastic. The diameter of the core is 200 $\mu$m and the diameter of the cladding is 230 $\mu$m (that is, the thickness of the cladding is 15 $\mu$m). The crack to be imparted to the optical fiber wire is preferably shallow. The more shallow the crack, the less scattering loss of the transmitting light at the cutting face (i.e., the amount of the introduction of the light and the amount of the emission of the light are increased). Accordingly, the transmitting distance of the light can be extended.

According to the result of the test (the number of the sample is 20), as shown in Table 2, the average and the vibration (3$\delta$) of the depth of the crack obtained by the cutter of the invention are smaller than those obtained by the related cutter. Accordingly, it was proved that the invention cuts more reliability.

TABLE 2

|  | cutter of Fig. 9 | related cutter of Fig. 12 |
|---|---|---|
| Ave. | 1.96 | 3.64 |
| 3$\delta$ | 4.32 | 12.43 | unit: $\mu$m

Figure 14:
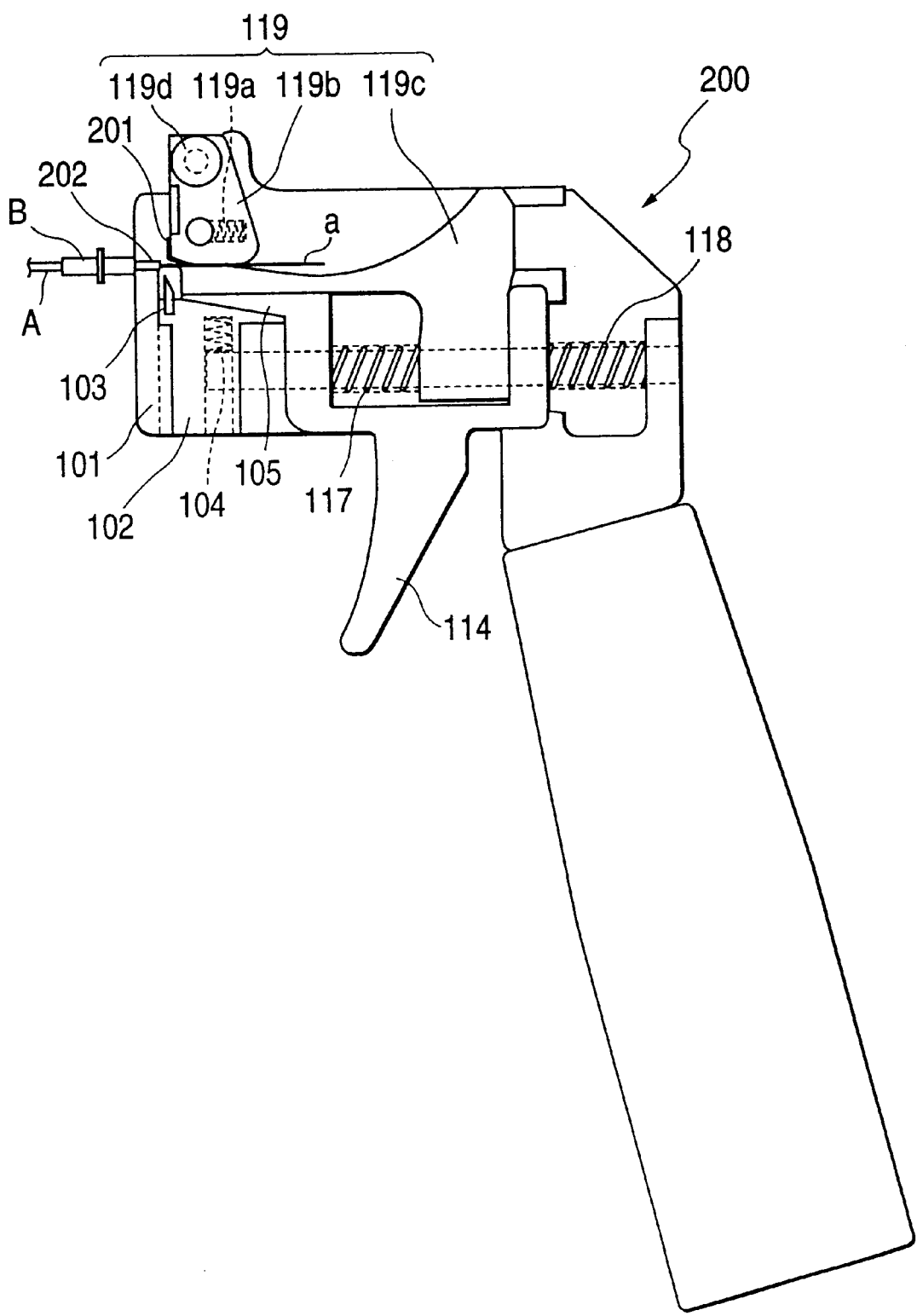
FIG. 14 is a side view of a modification of the hand-type optical fiber cutter shown in FIG. 10.

FIG. 14 shows another cutter 200 which is a modification of the hand-type optical fiber cutter 110. The cutter 200 has another chuck mechanism 119 instead of the chuck 116. The other components are configured in the same manner as those of the cutter 110 and thus designated by the same reference numerals. In the chuck mechanism 119, a cam 119b is urged clockwise around a cam holding pin 119d in the drawing by a spring 119a and abutted to a surface 201 of the holder 101 in an initial state. The cam 119b is rotatably fitted to a main portion 119c by the cam holding pin 119d. When the trigger 114 is pulled rightward in the drawing, the main portion 119c interlocked with the trigger 114 is also moved rightward. In conjunction with this operation, the cam 119b is rotated clockwise around the cam holding pin 119d, so that the optical fiber wire a is held between the cam 119b and the main portion 119c. Since the ferrule B is retained by an anchor part 202 of the holder 101, the movement of the main portion 119c is stopped in a condition that the wire a is completely held. When the trigger 114 is further pulled, the main portion 119c is given stress rightward in the drawing by the extension of the spring 117, so that tension is applied to the wire a.

As described the above, in the optical fiber cutter of the invention, since the cutting of the movable blade is conducted in accordance with the force of the elastic body having one end fixed at a predetermined position, indeterminate factors which cause variation of the blade pressure are decreased. As a result, cutting is performed with reduced variation and increased stability.

In addition, adjustment of the blade pressure is unnecessary. Accordingly, not only is the operation simplified, so is the structure. Also, variation in the adjustment is not caused.

Further, the structure regulating the movement of the blade base in accordance with the guide or cam prevents excessive cutting or impactive movement of the blade. This results in a good cutting face having no chip and no excessive cutting.

Moreover, since the blade is formed of a material which is lower in abrasion resistance than the guide or the cam, the blade base is abraded by rubbing the guide or cam. The movable cutter is expendable, and needs to be replaced when an edge of the blade is damaged. Therefore, when the movable blade is replaced, by simultaneously replacing the abraded blade base, the unabraded guide or cam can be reused. Thus, with this replacement of the blade base, the variation is distance according to the abrasion of the contact surface is modified and thus the blade pressure is further stabilized.

The entire disclosure of each and every foreign patent application from which the benefit of foreign priority has been claimed in the present application is incorporated herein by reference, as if fully set forth.

What is claimed is:

1. An optical fiber cutter for cutting an optical fiber, said optical fiber cutter comprising:

a tension applying means for applying a tension to the optical fiber, said tension applying means being mounted to the optical fiber cutter;

a movable blade for imparting a crack in the optical fiber to which the tension is applied, said movable blade being supported so as to reciprocate linearly;

a supporting structure provided at a predetermined position apart from the optical fiber;

an elastic body having one end engaged with said supporting structure producing an elastic restitutive force in said elastic body;

a blade base integrally movable with the movable blade, said blade base having a front side and a back side, said back side being engaged with another end of said elastic body;

a guide slidably contactable with a front portion of said front side, wherein at least one of contact surfaces of said guide and said front portion is inclined with respect to a slide direction of said guide, and a movement of said blade base is performed in association with a sliding movement of said guide and the elastic restitutive force of said elastic body to impart the crack in the optical fiber.

2. An optical fiber cutter according to claim 1, wherein said elastic body is a spring maintained in a tension state, and said blade base is moved in such a manner that said spring is shrunk.

3. An optical fiber cutter according to claim 1, wherein said elastic body is a spring maintained in a compression state, and said blade base is moved in such a manner that said spring is extended.

4. An optical fiber cutter according to claim 1, wherein the slide direction of said guide is perpendicular to a direction of the movement of said blade base.

5. An optical fiber cutter according to claim 1, wherein said blade base is formed of a material being less in abrasion resistance than a material of said guide.

6. An optical fiber cutter according to claim 1, wherein said tension applying means includes:
   a chuck main body movable in a direction perpendicular to a direction in which the blade base is movable; and
   a second cam urged by a spring and pivotable in conjunction with a movement of said chuck main body.

7. An optical fiber cutter for cutting an optical fiber, said optical fiber cutter comprising:
   a tension applying means for applying a tension to the optical fiber, said tension applying means being mounted to the optical fiber cutter;
   a movable blade for imparting a crack in the optical fiber to which the tension is applied, said movable blade being supported so as to reciprocate linearly;
   a supporting structure provided at a predetermined position apart from the optical fiber;
   an elastic body having one end engaged with said supporting structure producing an elastic restitutive force in said elastic body;
   a blade base integrally movable with the movable blade, said blade base having a front side and a back side, said back side being engaged with another end of said elastic body; and
   a cam rotatably supported at a fixed position, an outer periphery of said cam defining a cam face contactable with a front portion of said front side;
   wherein a movement of said blade base is performed in association with a rotation of said cam and the elastic restitutive force of said elastic body to impart the crack in the optical fiber.

8. An optical fiber cutter according to claim 7, wherein said blade base is formed of a material being less in abrasion resistance than a material of said cam.

9. An optical fiber cutter according to claim 7, wherein said tension applying means includes:
   a chuck main body movable in a direction perpendicular to a direction in which the blade base is movable; and
   a second cam urged by a spring and pivotable in conjunction with a movement of said chuck main body.

10. An optical fiber cutter according to claim 7, wherein said elastic body is a spring maintained in a tension state, and said blade base is moved in such a manner that said spring is shrunk.

11. An optical fiber cutter according to claim 7, wherein said elastic body is a spring maintained in a compression state, and said blade base is moved in such a manner that said spring is extended.

12. An optical fiber cutter for cutting an optical fiber according to claim 7 further comprising:
   said movable blade contactable with the optical fiber in a direction perpendicular to an axis of the optical fiber so as to impart an initial crack in the optical fiber to which the tension is applied, wherein said movable blade contacts the optical fiber in only one direction.

13. An optical fiber cutter according to claim 12, wherein the optical fiber is inserted and fixed into a ferrule, to thereby form an optical fiber, and
   said movable blade cuts a portion of the optical fiber projecting from the ferrule so that a cutting face of the optical fiber is flush with a tip end of the ferrule.

14. An optical fiber cutter for cutting an optical fiber, said optical fiber cutter comprising:
   a tension applying means for applying a tension to the optical fiber, said tension applying means being mounted to the optical fiber cutter;
   a movable blade for imparting a crack in the optical fiber to which the tension is applied, said movable blade being supported so as to reciprocate linearly;
   a supporting structure provided at a predetermined position apart from the optical fiber;
   an elastic body having one end engaged with said supporting structure producing an elastic restitutive force in said elastic body;
   a blade base integrally movable with the movable blade, said blade base having a front side and a back side, said movable blade being attached to said front side and said back side being engaged with another end of said elastic body, and
   a blade base motion mechanism for regulating a blade base motion against said restitutive force, wherein said blade base motion mechanism contacts a front portion of said front side.

15. An optical fiber cutter according to claim 14, wherein said elastic body is a spring maintained in a tension state, and said blade base is moved in such a manner that said spring is shrunk.

16. An optical fiber cutter according to claim 14, wherein said elastic body is a spring maintained in a compression state, and said blade base is moved in such a manner that said spring is extended.

17. An optical fiber cutter according to claim 14, further comprising:
   a holder accommodating a spring and said blade base;
   wherein said blade base motion mechanism comprising:
      a cam rotatably supported at a fixed position, an outer periphery of said cam defining a cam face contactable with a front face of said blade base, wherein a movement of said blade base is performed in association with a rotation of said cam.

18. An optical fiber cutter according to claim 14, wherein said tension applying means comprises:
   a chuck main body movable in a direction perpendicular to a direction in which the blade base is movable; and
   a second cam urged by a spring and pivotable in conjunction with a movement of said chuck main body.

19. An optical fiber cutter according to claim 14, further comprising: a holder accommodating a spring and said blade base; wherein said blade base motion mechanism comprises:

a guide slidably contactable with a front portion of said front side, wherein at least one of contact surfaces of said guide and said blade base is inclined with respect to a slide direction of said guide, and a movement of said blade base is performed in association with the slide of said guide.

20. An optical fiber cutter according to claim 19, wherein the slide direction of said guide is perpendicular to a direction of the movement of the blade base.

21. An optical fiber cutter according to claim 19, wherein said blade base is formed of a material being less in abrasion resistance than a material of said guide.

22. An optical fiber cutter for cutting an optical fiber according to claim 14 further comprising:

said movable blade contactable with the optical fiber in a direction perpendicular to an axis of the optical fiber so as to impart an initial crack in the optical fiber to which the tension is applied;

wherein said movable blade contacts the optical fiber in only one direction, which is perpendicular to the axis of the optical fiber.

23. An optical fiber cutter according to claim 22, wherein the optical fiber is inserted and fixed into a ferrule, to thereby form an optical fiber, and said movable blade cuts a portion of the optical fiber projecting from the ferrule so that a cutting face of the optical fiber is flush with a tip end of the ferrule.

* * * * *